(12) United States Patent
Quinn et al.

(10) Patent No.: US 10,572,909 B2
(45) Date of Patent: Feb. 25, 2020

(54) HYBRID CLIENT-SIDE BEACON TRACKING

(71) Applicant: Verizon Digital Media Services Inc., Dulles, VA (US)

(72) Inventors: Thomas Quinn, Park City, UT (US); Nathan James Edwards, Vineyard, UT (US); Trevor Hunsaker, Bountiful, UT (US); Kenneth Alan Brueck, Draper, UT (US)

(73) Assignee: Verizon Digital Media Services Inc., Dulles, VA (US)

(*) Notice: Subject to any disclaimer, the term of this patent is extended or adjusted under 35 U.S.C. 154(b) by 525 days.

(21) Appl. No.: 15/347,373

(22) Filed: Nov. 9, 2016

(65) Prior Publication Data
US 2018/0130099 A1    May 10, 2018

(51) Int. Cl.
*G06Q 30/02* (2012.01)
*H04L 29/08* (2006.01)
*H04L 29/06* (2006.01)

(52) U.S. Cl.
CPC ..... *G06Q 30/0277* (2013.01); *H04L 65/4069* (2013.01); *H04L 65/602* (2013.01); *H04L 65/607* (2013.01); *H04L 67/22* (2013.01)

(58) Field of Classification Search
CPC combination set(s) only.
See application file for complete search history.

(56) References Cited

U.S. PATENT DOCUMENTS

| | | | |
|---|---|---|---|
| 2009/0259552 A1* | 10/2009 | Chenard | G06Q 30/02 705/14.72 |
| 2014/0115631 A1* | 4/2014 | Mak | H04N 21/23424 725/42 |
| 2014/0181243 A1* | 6/2014 | Nieuwenhuys | H04L 29/06448 709/217 |
| 2015/0026308 A1* | 1/2015 | MacTiernan | H04N 21/23424 709/219 |
| 2015/0067185 A1* | 3/2015 | Tamblin | H04N 21/2407 709/231 |
| 2016/0119661 A1* | 4/2016 | Jonnadula | H04N 21/812 725/32 |
| 2016/0316233 A1* | 10/2016 | Ghadi | H04N 21/26258 |

* cited by examiner

*Primary Examiner* — Marie P Brady
(74) *Attorney, Agent, or Firm* — Ansari Katiraei LLP; Arman Katiraei; Sadiq Ansari

(57) ABSTRACT

The embodiments implement server-side third party content insertion with client-side tracking beacon. The solution embeds third party content within designated breaks of primary content to form a single unified stream that is streamed to a client requesting the primary content. The unified stream allows the client to receive all content without switching between different streams and prevents advertisement blockers running on the client from differentiating the third party content from the primary content and from blocking the third party content. The solution also generates and sends to the client, a configuration containing events and destinations the different content providers define for their respective content. The client monitors for the events specified in the configuration during playback of the unified stream. An event that is triggered causes the client to send a tracking beacon to a content provider specified destination associated with the event.

18 Claims, 5 Drawing Sheets

310

```
"breaks": [
  {
    "breakId": "0.0.0.918373367",
    "timeoffset": 52.31039149999312,
    "duration": 71.03231249999999,
    "ads": [
      {
        "creative": "99698c4be3fb41efa36a8b4383dba0f8",
        "duration": 9.962666666666665,
        "events": {
          "firstquartiles": ["abc.com/beacon25%"],
          "midpoints": ["abc.com/beacon50%"],
          "thirdquartiles": ["abc.com/beacon75%"]
          "completes": ["abc.com/beacon100%"],
        },
        "mimeType": "uplynk/m3u8"
      },
      {
        "creative": "http://example.com/tv2n/telemetry_player_vpaid_as3.../"
        "duration": 31.0,
        "events": {
          "clickthroughs": ["example.com/beac/click"],
          "completes": ["example.com/beac/complete"],
          "impressions": ["example.com/beac/track11"],
        },
        "mimeType": "application/x-shockwave-flash"
      },
      {
        "creative": "e7261e3a52894cb3927ad22b57632fee",
        "duration": 30.06964583333333,
        "events": {
          "clickthroughs": ["xyz.com/beac/100"],
          "firstquartiles": ["xyz.com/beac/2342"],
          "completes": ["xyz.com/beac/843"],
        },
        "mimeType": "uplynk/m3u8"
      }
    ],
  }
```

320 → breakId / timeoffset / duration
325 → ads
330 → creative
340 → duration
350 → events
360 → events block contents

FIG. 3

HYBRID CLIENT-SIDE BEACON TRACKING

BACKGROUND ART

Content streaming typically involves a client receiving requested primary content from a first server and advertisements or other third party content presented during breaks of the primary content from different third party servers. Streaming provides a direct one-to-one connection between the sending server and the receiving client. The one-to-one connection allows the sending server to track client progression through the sent content. This tracking is especially beneficial for advertisers and third party content providers as it allows them to more accurately determine advertising campaign effectiveness as well as more accurately determine payments related to the advertisement presentation.

To combat advertisement blockers and simplify logic on the client player, some streaming providers have shifted to a pure server-side streaming solution. The server-side streaming solution provides a single stream to a client. Embedded within that single stream are the primary media content, different advertisements, and other third party content not part of the primary media content. The client therefore receives the primary media content, different advertisements, and other third party content forming the single stream without switching between streams, Uniform Resource Locators (URLs), or servers. As a result, the client or advertisement blockers running on the client cannot differentiate between the different content in the single stream, which in turn prevents the client or advertisement blockers from blocking advertisements or other third party content while allowing the primary content.

Such a pure server-side streaming solution has various incompatibilities with traditional impression tracking and reporting. In particular, the different content providers whose content are included in the single stream no longer have the one-to-one direct connection with the client. Instead, the server sending the single stream tracks when playback at a client reaches certain milestones or impressions for each of the different content that is combined to form the single stream. The server then distributes the tracking beacons to the advertisers and third party content providers whose content is combined in the single stream. The server-side streaming solution therefore requires a shift from traditional client-side beacon tracking to server-side beacon tracking.

With traditional client-side beacon tracking, the advertisers or third party content providers collect each client generated tracking beacon from the Internet Protocol (IP) address of that client. With server-side beacon tracking, the streaming server collects tracking beacons for all clients viewing the single stream from the streaming server. The streaming server then sends the collective bundle of beaconing information for all users to the advertisers or third party content providers. In other words, an advertiser receives the collective bundle of beaconing information for different clients from a single Internet Protocol (IP) address of the streaming server.

In some cases, the advertisers or third party content providers ignore the collective bundle of beaconing information provided by the streaming server because the volume of beaconing information is too large to come from a single source. In some other cases, the advertisers or third party content providers cannot correctly process the collective bundle of beaconing information provided by the streaming server because the advertisers or third party content providers are unable to accurately map the individual tracking beacons back to the individual clients that generated the tracking beacons.

The server-side beacon tracking also restricts the advertisers and third party content provider from being able to customize the information that is reported and when it is reported. The advertisers and third party content providers are dependent on when and what beaconing information is collected from the individual clients by the streaming server.

The inability to customize the reported tracking beacons could result in incompatibilities with the content provider's existing systems or result in tracking beacons that lack information needed or that is pertinent to the content provider. In particular, the server-side beacon tracking can disrupt programmatic advertisement insertion performed by some content providers, whereby content providers rely on tracking beacons reported on a per session, per client player, or per advertisement basis in order to target advertisements and other third party content to different clients.

Also, by losing the direct connections with the clients as a result of the server-side beacon tracking, the content providers lose the ability to access certain client information that is not available or is unrelated to the tracking beacons. For example, some content providers rely on information inserted in cookies on the client machine or client device identifiers to enhance the impression tracking or perform other functions such as programmatic advertisement insertion.

Accordingly, there is a need to adapt a pure server-side streaming solution to incorporate aspects of client-side beacon tracking. There is a need to remove the streaming server as the middle layer collecting and reporting tracking beacons from clients to different third party content providers. Stated differently, there is a need for the streaming server to deliver a single stream that embeds third party content directly with primary content, and for the third party content providers to derive custom tracking beacons directly from the clients receiving the single stream.

BRIEF DESCRIPTION OF THE DRAWINGS

A preferred embodiment of methods and systems for hybrid client-side beacon tracking will now be described, by way of example only, with reference to the accompanying drawings in which:

FIG. 3 presents an exemplary client-side beaconing configuration that a streaming server provides to a client in accordance with some embodiments.

DETAILED DESCRIPTION

The embodiments implement a hybrid solution providing server-side third party content insertion with client-side beacon tracking. In doing so, the hybrid solution combines the benefits of a pure server-side streaming solution with the benefits of traditional client-side beacon tracking.

The server-side third party content insertion component of the hybrid solution embeds third party content within designated breaks of primary content to form a single unified stream that is streamed to a client requesting the primary content. From the unified stream, the client receives the primary content and the embedded third party content without switching between different streams, servers, or Internet Protocol (IP) addresses. Advertisement blockers running on the client therefore cannot differentiate between the third party content and the primary content, and cannot block the third party content as a result.

The client-side tracking beacon component of the hybrid solution generates and sends a client-side beaconing configuration with or before the unified stream. The configuration is formed from tracking beacon events and destinations the different content providers define for their respective content. The client requesting the primary content receives the unified stream and the client-side beaconing configuration. The client monitors for the tracking beacon events specified in the configuration during playback of the unified stream. An event triggered during playback of particular third party content from within the unified stream causes the client to send one or more tracking beacons to one or more destinations associated with the event, wherein the destinations are defined by the content provider of the particular third party content. Consequently, each particular content provider can receive custom tracking beacons directly from the clients as the clients playback the embedded third party content of the particular content provider from the unified stream, and the playback triggers different events defined in the configuration provided to the clients.

Figure 1:
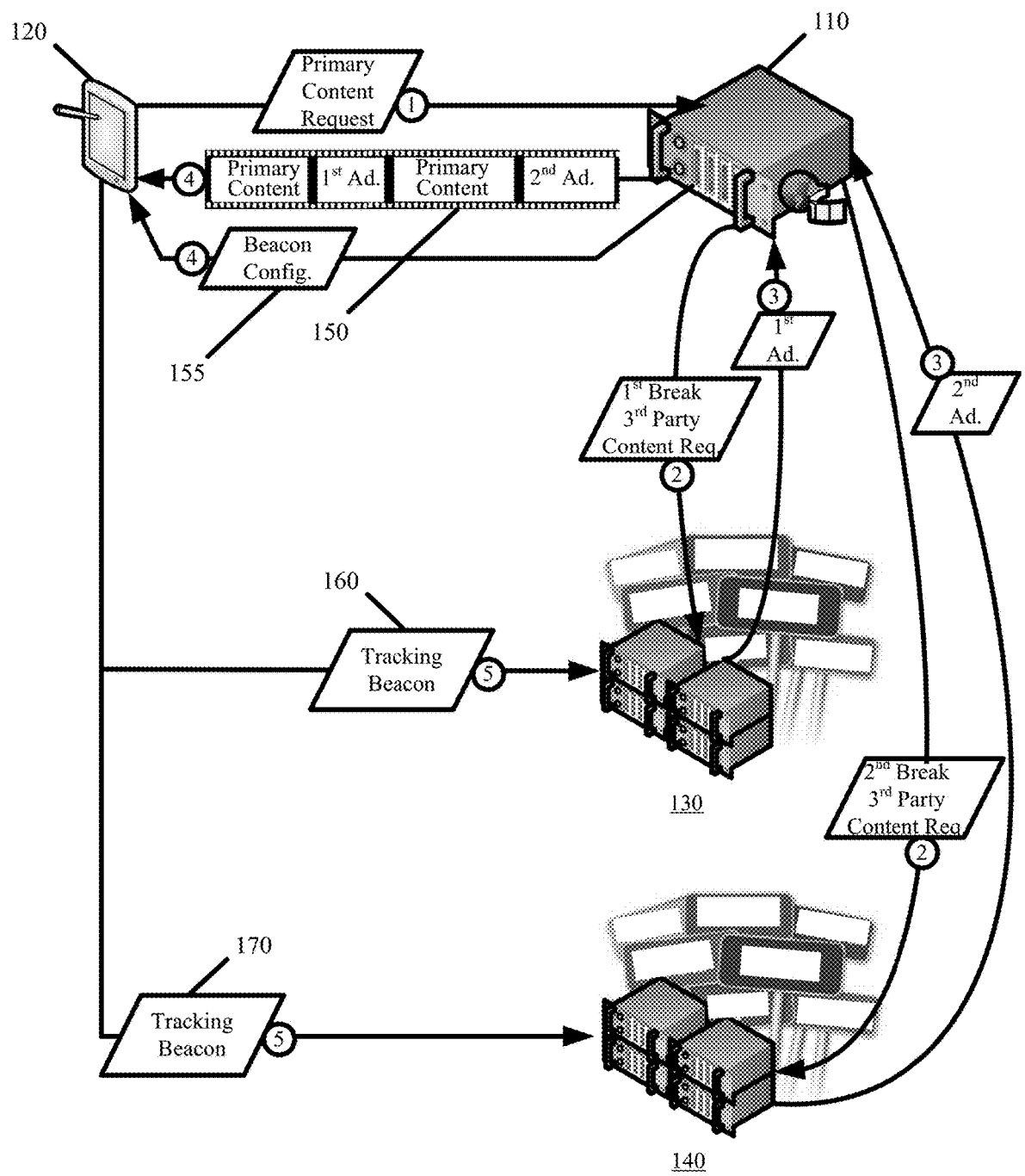
FIG. 1 conceptually illustrates the hybrid solution architecture and operation in accordance with some embodiments.

FIG. 1 conceptually illustrates the hybrid solution architecture and operation in accordance with some embodiments. The figure depicts a streaming server 110, a client 120, and different third party content providers 130 and 140 that provide advertisements and other third party content.

The client 120 requests primary content from the streaming server 110. In preferred embodiments, the primary content is media content or content having multiple parts separated by one or more breaks with each part having a temporal duration. The streaming server 110 implements the hybrid solution by retrieving third party content from the content providers 130 and 140 and by inserting the third party content in the breaks of the primary content to form unified stream 150. The streaming server 110 also forms the beaconing configuration 155 based on tracking beacon events defined by the content providers 130 and 140 for the inserted third party content. The streaming server 110 serves the unified stream 150 and the beaconing configuration 155 to the client 120 in response to the request for primary content. In response to triggering different events specified in the configuration 155 upon, during, or after the client 120 playback of the third party content of each content provider 130 and 140 from the unified stream 150, the client 120 sends tracking beacons 160 and 170 to the content providers 130 and 140.

In some embodiments, the beaconing configuration identifies indices, time offsets, and durations for different third party content included as part of the unified stream passed to a client. The beaconing configuration can further identify the third party content, different events triggering tracking beacons, and ping Uniform Resource Locators (URLs) that the client invokes upon triggering the different events. The ping URLs specify where the tracking beacons are sent.

The third party content providers can customize parts of the beaconing configuration that relate to their third party content. In doing so, the third party content providers can customize what tracking beacons are reported, when the tracking beacons are reported, and where the tracking beacons are reported when third party content provider content is played back by a client. For instance, a first content provider can specify a first set of events associated with a first set of ping URLs and a second content provider can specify a different second set of events associated with a different second set of ping URLs. A streaming server of the hybrid solution includes the first set of events and the second set of events in the beaconing configuration for a unified stream that includes the corresponding content of these first and second content providers into breaks of primary content. The client executes the beaconing configuration in conjunction with rendering the unified stream, thereby monitoring and firing tracking beacons as specified by each of the content providers based on what is provided by the streaming server to the client in response to the client's original request for primary content.

As noted above, the streaming server sends the beaconing configuration with or before sending the unified stream to a client requesting the primary content. In some embodiments, the streaming server sends the beaconing configuration for a particular unified stream to a client in response to a separate request and response process for the beaconing configuration. The sending of the beaconing configuration can also be initiated in response to the client's original request for the primary content. For instance, in response to the request for the primary content, the streaming server sends the beaconing configuration with a redirect or forwarding URL by which the client then requests the unified content stream with the primary content and the included third party content from the streaming server. Alternatively, the streaming server could send the unified content stream with a redirect or forwarding URL by which the client then requests the beaconing configuration from the streaming server. In some other embodiments, the streaming server embeds markers, signals, or other metadata providing the beaconing configuration in the unified stream.

In some embodiments, the client monitors the stream playback relative to the events defined within the beaconing configuration. Each event is triggered at either a different point during playback of the unified stream or in response to a client action invoked during playback. Triggering an event causes the client to send a tracking beacon to the ping URL defined for that particular event.

The embodiments support simple and complex tracking beacons. The particulars of the tracking beacon can be defined as part of the ping URL. For instance, different query string parameters, paths, identifiers of the ping URL can specify if playback of third party content has commenced, ended, or reached certain milestones, times, or percentages. The headers or body of the tracking beacon can also be populated with the particulars of the triggered event. By customizing the ping URL or the tracking beacon packet, content providers can customize how much and what information is included in the tracking beacons.

In some embodiments, a client-side software development kit (SDK) controls the client-side processing of the beaconing configuration. In other words, the client-side SDK parses the configuration break information (including events and ping URLs) and monitors for event triggering during playback of the unified stream. The SDK can be embedded in the client application or can be passed by the streaming server with the client-side beaconing configuration and/or unified stream. In some embodiments, the SDK is a script (e.g., JavaScript) while in others may be native code specific to the underlying platform (e.g., Java for Android or Objective C for iOS). The SDK runs in conjunction with a variety of different devices, applications, and operating systems. Accordingly, the client-side tracking beacon component of the hybrid solution can be adapted for execution on computers, tablets, smartphones, mobile devices, set-top units, and other streaming devices.

In some embodiments, the client-side tracking beacon component further provides an application programming interface (API) with which third party content providers define and customize tracking beacon information for their third party content. The API further links content provider defined tracking beacon information to the corresponding third party content so that the streaming server is able to populate the beaconing configuration with the correct break information or events based on the third party content that is included with the primary content when forming or passing a unified stream to a client.

Figure 2:
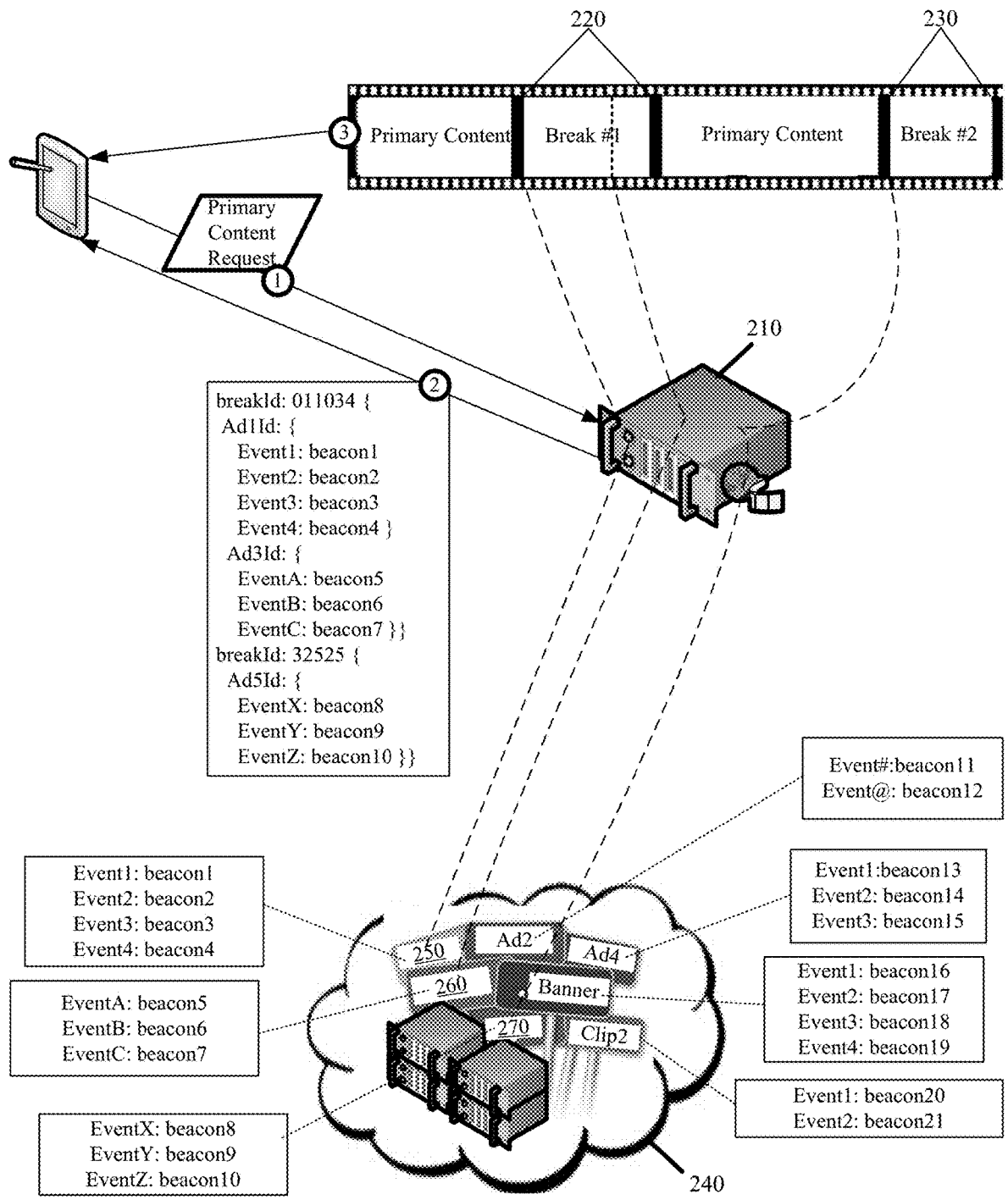
FIG. 2 conceptually illustrates creating a unified stream and generating a client-side beaconing configuration based on the created unified stream.

In accordance with some embodiments, FIG. 2 conceptually illustrates creating a unified stream and generating a client-side beaconing configuration based on the created unified stream. The figure illustrates a streaming server 210 responding to a client request for primary content, wherein the primary content includes two breaks 220 and 230 of different lengths. The figure further illustrates a set of third party content 240 available for insertion within the primary content breaks and different break information defined for the different third party content.

In responding to the client request, the streaming server 210 selects and obtains first and second advertisements 250 and 260 from the available set of third party content 240 for inclusion during the first break 220, and a third advertisement 270 from the available set of third party content 240 for inclusion during the second break 230. In some embodiments, the client request or request URL identifies the first, second, and third advertisements 250, 260, and 270 for inclusion as part of the primary content. In some such embodiments, the URL specifies a list of asset identifiers corresponding to the primary content, first advertisement 250, second advertisement 260, and third advertisement 270. In some other embodiments, the streaming server 210 dynamically selects the third party content to embed with the primary content. The selection can be based on a session identifier or other identifier submitted with the client request. The session identifier or other identifier provides identifying information about the client. The streaming server 210 then uses this identifying information in selecting third party content that best targets or is most relevant to the client. Alternatively, the selection can be based on fulfilling different third party content provider campaigns. For instance, a particular third party content provider may request one hundred impressions for its content. Accordingly, the streaming server selects the particular third party content provider content for inclusion in different streams until the one hundred impressions are reached and the campaign is complete.

The streaming server 210 generates the unified stream with the primary content, the first and second advertisements 250 and 260 included during the first break 220, and the third advertisement 270 included during the second break. In some embodiments, generating the unified stream involves re-encoding the primary content with the different advertisements 250, 260, and 270. The encoding result produces one file or one set of chunks with which to stream the unified stream. In some other embodiments, generating the unified stream involves dynamically streaming chunks of the primary content encoding, the first advertisement 250 encoding, the second advertisement 260 encoding, and the third advertisement 270 encoding in correct ordering and in response to the request for the primary content from the client so that the advertisements 250, 260, and 270 appear as if they were originally part of the primary content.

Although not shown, the streaming server 210 also generates a stream manifest to send to the client. The stream manifest lists for the client, the different chunks or segments of the unified stream with which the client requests the primary content and the embedded advertisements or third party content. The stream manifest may list chunks from the single file or asset of the re-encoded unified stream. Alternatively, the stream manifest may list chunks having different names corresponding to the different encoded files of the content forming the unified stream.

The streaming server 210 forms the client-side beaconing configuration in part from the beacon events that the third party content providers defined for each of the first, second, and third advertisements 250, 260, and 270. This includes the trigger (i.e., timing or condition) and ping URL defined for each beacon event. The streaming server 210 further forms the client-side beaconing configuration by identifying and including in the configuration, the timing for each advertisement 250, 260, and 270 and the timing at which each of the advertisements 250, 260, and 270 commences within the unified stream. For instance, the configuration may specify that the first advertisement 250 starts at time X of the unified stream playback, with a duration of Y, and a first event that is triggered upon reaching the first quartile (i.e., 25%) of the first advertisement 250, wherein triggering the first event invokes one or more ping URLs to send a tracking beacon to one or more recipients. Based on this information, the client SDK determines the exact or absolute time or condition for when the first event is triggered. In some other embodiments, the streaming server processes the beacon events in conjunction with the identified durations and timing in order to populate the beaconing configuration with absolute times or conditions at which each event is triggered. In these embodiments, the configuration specifies that the first event is triggered at time (Y/4)+X of the unified stream playback, wherein triggering the first event still invokes the one or more ping URLs.

FIG. 3 presents an exemplary client-side beaconing configuration 310 that a streaming server provides to a client in accordance with some embodiments. In some embodiments, the streaming server dynamically generates the configuration 310 as part of creating a unified stream in which the streaming server inserts three different instances of third party content within a particular break of the primary content that is requested by the client.

The configuration 310 includes various tags. The tags demarcate the configuration elements and simplify the execution of the configuration 310 by the client-side SDK.

Each break within the primary content or unified stream is demarcated with a "breakId" element and a unique identifier in the configuration 310. In this figure, the particular break of the primary content is identified with the "breakId" element 320 and the unique identifier "0.0.0.918373367". The unique identifier can be any alphanumeric value.

Each "breakId" element is associated with a "timeoffset" element, a "duration" element, and an "ads" element 325. The "timeoffset" element for "breakId" element 320 identifies the time at which the particular break identified by the "breakId" element 320 commences within playback of the corresponding unified stream. The "duration" element for "breakId" element 320 specifies the total length of the particular break. The "ads" element 325 defines the beacon events for each of the three instance of third party content that is included within the particular break identified by the breakId element 320. A "creative" element 330, a "duration" element 340, and an "events" element 350 is provided for each instance of third party content under the "ads" element 325.

The "creative" element 330 provides a unique identifier for each advertisement or third party content defined during the particular break. The "creative" element 330 therefore differentiates between the events that are defined for the different advertisements included within the same break.

The "duration" element 340 defines the length of a specific advertisement or third party content instance represented by the corresponding "creative" element 330.

The "events" element 350 defines the beacon events for the advertisement or third party content identified by the corresponding "creative" element 330. Each "events" element 350 includes one or more different subelements 360 defining the actions or conditions that trigger tracking beacon reporting during playback of particular third party content.

Some actions or conditions that can be defined under the "events" element 350 include, "firstquartiles", "midpoints", "thirdquartiles", "completes", "clickthroughs", and "impressions". The "firstquartiles" subelement contains a ping URL that the client invokes when playback of the particular third party content reaches 25% of the total duration identified from the corresponding "duration" element 340. Similarly, the "midpoints", "thirdquartiles", and "completes" subelements contain pingURLs that are invoked when playback of the particular third party content reaches 50%, 75%, and full playback of the total duration identified from the corresponding "duration" element 340. In some embodiments, the client SDK keys the triggering of these events based on the specified action or condition of the events, the timing information provided by the corresponding "duration" element 340, and the "timeoffset" for the "breakId" element 320 under which the third party content is defined. The "clickthroughs" subelement contains a ping URL that the client invokes if the user performs a click action during playback of the particular third party content. The "clickthroughs" subelement can also contain a URL to a page that the client requests if the subelement is triggered. The "impressions" subelement contains a ping URL and/or a URL that directs the client to a tracking resource file that the client should request when the first frame of the particular third party content is displayed.

By customizing the pingURLs defined for each event subelement, third party content providers can identify exactly which event is triggered, for what content, and by which client, wherein the client identification can be based on the client's IP address or other identifiers such as information within a cookie on the client, device identifiers (e.g., user agent information), etc. For example, the content provider can define a first pingURL to signify playback reaching the first quartile and a second pingURL to signify playback reaching the midpoint. Alternatively, the same pingURL can be invoked, but with different query string arguments appended to the pingURL, or values inserted in the packet header or packet body.

Some embodiments provide several other event subelements with which third party content providers can customize the reporting of the tracking beacons. For instance, the event subelements of some embodiments can define specific points in time, specific time offsets, or specific playback percentages at which different ping URLs are triggered. The event subelements of some embodiments can also define custom conditions that trigger depending on the client screen resolution, memory, or other resources.

Event subelements can also be linked. A ping URL for a linked event triggers when two or more timings, conditions, or some combination thereof are satisfied. For example, an event can be defined to trigger when playback reaches the first quartile and rewind control is invoked.

Figure 4:
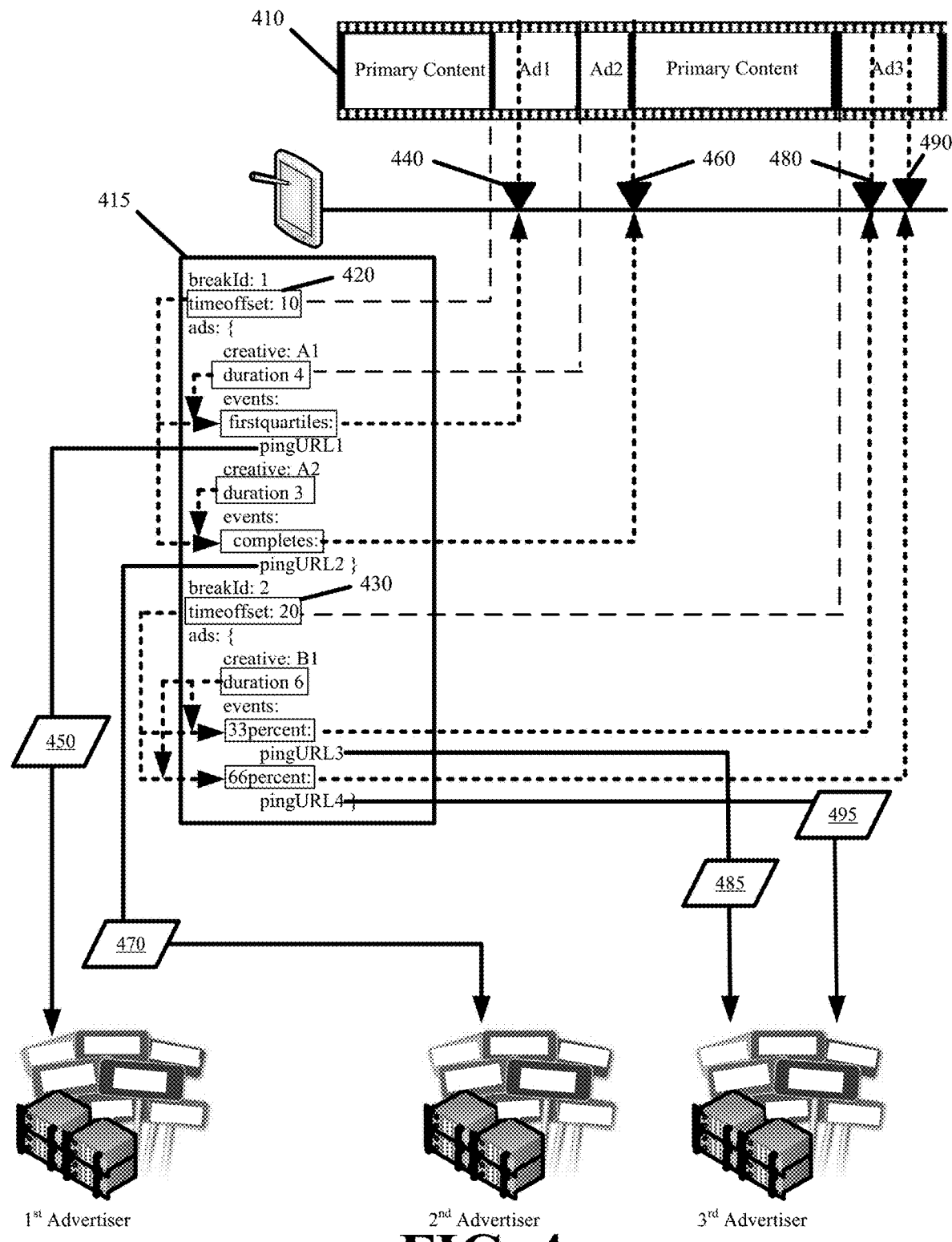
FIG. 4 conceptually illustrates tracking beacons sent from a client to first, second, and third advertisers based on break information from a client-side beaconing configuration that a streaming server of some embodiments provides with a single unified stream.

FIG. 4 conceptually illustrates tracking beacons sent from a client to first, second, and third advertisers based on beacon events from a client-side beaconing configuration 415 that a streaming server of some embodiments provides with a single unified stream 410 to the client. The unified stream 410 is comprised of primary content, a first advertisement of a first advertiser, a second advertisement of a second advertiser, and a third advertisement of a third advertiser.

The primary content has two breaks. The first and second advertisements are presented during the first break. The third advertisement is presented during the second break.

The beaconing configuration 415 specifies a first "breakId" element with first a "timeoffset" element 420 value that corresponds to the start time of the first break. Under the first "breakId" element is an "ads" element with the beacon events defined for the first and second advertisements. The beacon events for the first advertisement are defined by the subelements of the "events" element associated with the first "creative" element under the "ads" element. The beacon events for the second advertisement are defined by the subelements of the "events" element associated with the second "creative" element under the "ads" element. The "duration" element associated with each "creative" element provides the duration for each of the first and second advertisements.

The beaconing configuration 415 also specifies a second "breakId" element with second a "timeoffset" element 430 value that corresponds to the start time of the second break. Under the second "breakId" element is an "ads" element with the beacon events defined for the third advertisement, wherein the third advertisement is identified by the third "creative" element under the second "breakId" "ads" element and the duration of the third advertisement is identified by the "duration" element associated with the third "creative" element.

The client is directed to the beacon events defined for the first break in the beaconing configuration once client playback of the unified stream reaches the value specified for the first "timeoffset" element 420 in the beaconing configuration. In particular, upon playback reaching the first break time offset and for the duration specified by the "duration" element associated with the first "creative" element, the client determines whether the playback triggers any events defined under the "events" element associated with the first "creative" element. Upon playback reaching the end of the first advertisement and for the duration specified by the "duration" element associated with the second "creative" element, the client determines whether the playback triggers any events defined under the "events" element associated with the second "creative" element.

At time 440, playback of the first advertisement triggers the event defined under the "events" elements associated with the first "creative" element. The client determines the event trigger based the event condition (i.e., "firstquartiles"), the duration of the first advertisement, and the time offset for when the first break commences. From these values, the client determines the absolute time for the event trigger. In response to the triggering of this event, the client invokes the ping URL associated with the event which causes the client to send a first tracking beacon 450 to the first advertiser.

Meanwhile, the client continues playback of the unified stream. After finishing playback of the first advertisement, the client being playback of the second advertisement also included in the first break with the first advertisement. At time 460, playback of the second advertisement triggers the event defined under the "events" elements associated with the second "creative" element, the client invokes the ping URL associated with the event which causes the client to send a second tracking beacon 470 to the second advertiser.

The client is subsequently directed to the beacon events defined for the second break in the beaconing configuration once client playback of the unified stream continues through the second part of the primary content and reaches the value specified for the second "timeoffset" element 430 in the beaconing configuration. The client sends a third tracking beacon 485 to the third advertiser in response to client playback of the third advertisement at 480 satisfying an event and triggering a ping URL defined under the "events" elements associated with the third "creative" element of the third advertisement. The client further sends a fourth tracking beacon 495 to the third advertiser in response to client playback of the third advertisement at 490 satisfying a second event and triggering a second ping URL defined under the "events" elements associated with the third "creative" element.

Some embodiments implement the hybrid solution when an advertisement blocker is detected on the requesting client. In cases where no advertisement blocker is detected, the streaming server can revert to the traditional streaming model in which the client receives the primary content from the streaming server and invokes different URLs during breaks within the primary content in order to obtain advertisements directly from third party content providers before reverting back to the streaming server.

The streaming server detects presence of an advertisement blocker on a client upon receiving a request from the client. The streaming server may send link to a known black listed third party content provider to determine if the link is blocked. If blocked, the streaming server streams the requested content using the hybrid solution set forth herein. In particular, the streaming server retrieves third party content from different third party content providers and directly embeds the third party content in designated breaks of the requested primary content. The streaming server also generates the break information to send to the client to activate client-side beacon tracking for the unified stream sent by the streaming server. If the test link is invoked by the client, then the streaming server can revert to the traditional streaming model.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 5:
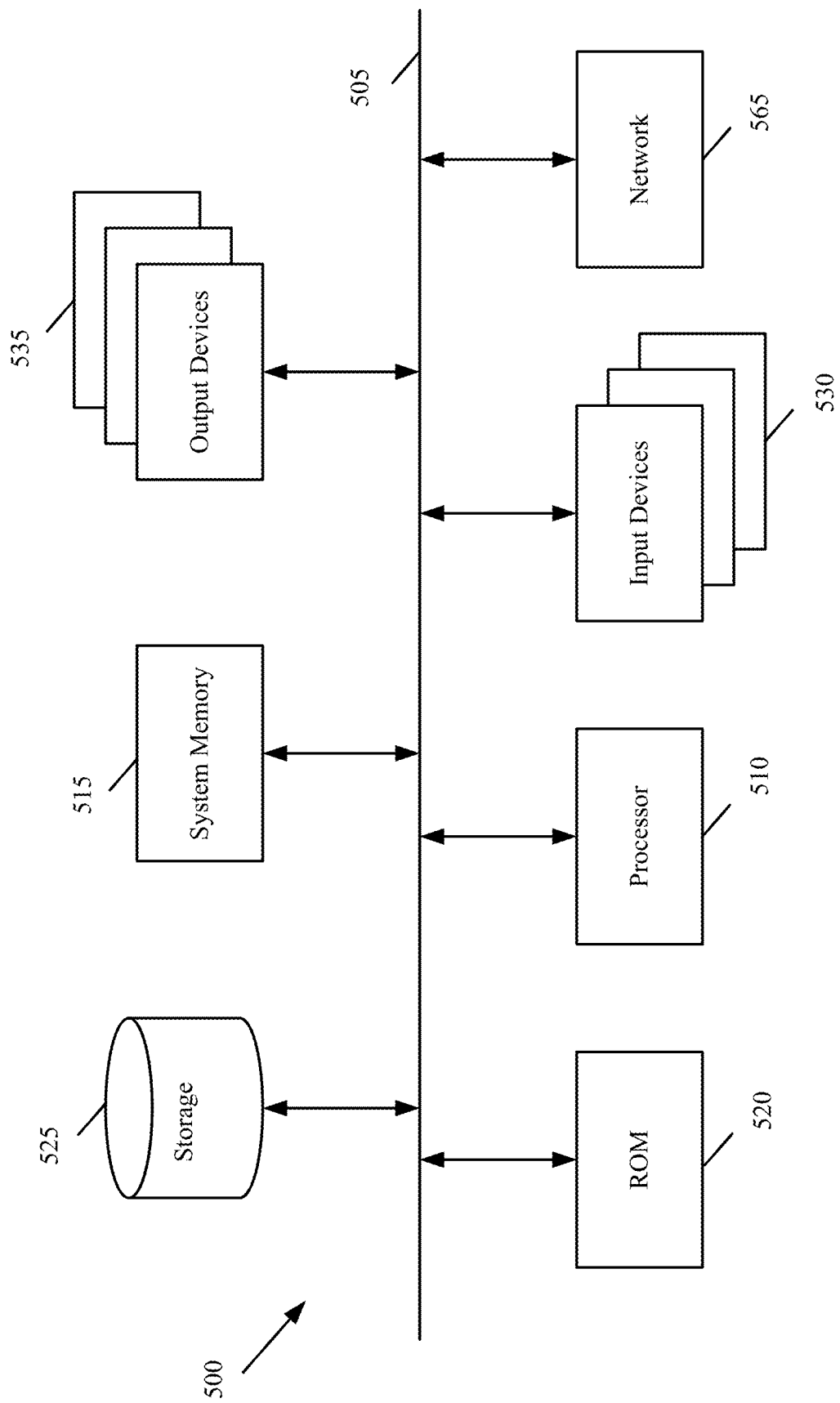
FIG. 5 illustrates a computer system or server with which some embodiments are implemented.

FIG. 5 illustrates a computer system or server with which some embodiments are implemented. Such a computer system includes various types of computer-readable mediums and interfaces for various other types of computer-readable mediums that implement the various methods and machines described above (e.g., streaming server or third party content provider). Computer system 500 includes a bus 505, a processor 510, a system memory 515, a read-only memory 520, a permanent storage device 525, input devices 530, and output devices 535.

The bus 505 collectively represents all system, peripheral, and chipset buses that communicatively connect the numerous internal devices of the computer system 500. For instance, the bus 505 communicatively connects the processor 510 with the read-only memory 520, the system memory 515, and the permanent storage device 525. From these various memory units, the processor 510 retrieves instructions to execute and data to process in order to execute the processes of the invention. The processor 510 is a processing device such as a central processing unit, integrated circuit, graphical processing unit, etc.

The read-only-memory (ROM) 520 stores static data and instructions that are needed by the processor 510 and other modules of the computer system. The permanent storage device 525, on the other hand, is a read-and-write memory device. This device is a non-volatile memory unit that stores instructions and data even when the computer system 500 is off. Some embodiments use a mass-storage device (such as a magnetic, solid-state, or optical disk) as the permanent storage device 525.

Other embodiments use a removable storage device (such as a flash drive) as the permanent storage device Like the permanent storage device 525, the system memory 515 is a read-and-write memory device. However, unlike storage device 525, the system memory is a volatile read-and-write memory, such as random access memory (RAM). The system memory stores some of the instructions and data that the processor needs at runtime. In some embodiments, the processes are stored in the system memory 515, the permanent storage device 525, and/or the read-only memory 520.

The bus 505 also connects to the input and output devices 530 and 535. The input devices enable the user to communicate information and select commands to the computer system. The input devices 530 include alphanumeric keypads (including physical keyboards and touchscreen keyboards), pointing devices. The input devices 530 also include audio input devices (e.g., microphones, MIDI musical instruments, etc.). The output devices 535 display images generated by the computer system. The output devices include printers and display devices, such as cathode ray tubes (CRT) or liquid crystal displays (LCD).

Finally, as shown in FIG. 5, bus 505 also couples computer 500 to a network 565 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 500 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving from a client device at a particular streaming server, a request directed to primary content of a first content provider that is served from the particular streaming server, the primary content comprising at least a first break;
selecting at the particular streaming server, third party content of a second content provider to enter in the first break of the primary content;
obtaining at the particular streaming server from the second content provider, a first set of beacon events, that correspond to different points during playback of the third party content, at which tracking beacons configured by the second content provider are sent directly to the second content provider;
sending from the particular streaming server to the client device in response to said selecting, a tracking beacon configuration comprising the first set of beacon events defined for the third party content by the second content provider;
sending from the particular streaming server to the client device in response to the request, a unified stream instead of the primary content, the unified stream comprising the primary content from the first content provider, and the third party content from the second content provider included in the first break of the primary content; and
directing from the client device to the second content provider, a tracking beacon in response to playback of the unified stream on the client device reaching a point in the third party content that triggers one of the first set of beacon events from the tracking beacon configuration.

2. The method of claim 1, wherein the first set of beacon events comprises a first event and a first Uniform Resource Locator (URL) with the second content provider as a destination of the first URL.

3. The method of claim 2, wherein said directing comprises invoking the first URL in response to playback of the third party content reaching a particular point at which the first event is triggered.

4. The method of claim 3, wherein the first set of beacon events further comprises a second event and a second URL with the second content provider as a destination of the second URL.

5. The method of claim 4 further comprising directing a second tracking beacon to the second content provider as a result of triggering the second event during playback of the third party content on the client device, wherein said triggering invokes the second URL.

6. The method of claim 1 further comprising inserting an identifier within the tracking beacon configuration, the identifier designating a start of the first break.

7. The method of claim 6, wherein said directing comprises triggering a particular beacon event of the first set of beacon events in response to playback of the unified stream reaching a time derived from said identifier and a condition associated with the particular beacon event.

8. The method of claim 1, wherein the primary content is media content and the third party content of the second content provider is an advertisement.

9. The method of claim 1 further comprising obtaining the third party content from the second content provider.

10. The method of claim 1, wherein said directing comprises invoking a first URL, that is associated with a first beacon event of the first set of beacon events from the tracking beacon configuration, in response to playback of the unified stream on the client device reaching a first time within the third party content of the second content provider, and invoking a second URL, that is associated with a second beacon event of the first set of beacon events from the tracking beacon configuration, in response to the playback of the unified stream on the client device reaching a later second time within the third party content of the second content provider.

11. A method comprising:
receiving a request for primary content at a particular streaming server from a client device, said primary content comprising at least a first break and a second break;
retrieving to the particular streaming server from a first content provider, first content provided by the first content provider, and a first set of beacon events, that correspond to different points during playback of the first content, at which tracking beacons configured by the first content provider are sent directly to the first content provider;
retrieving to the particular streaming server from a second content provider, second content provided by the second content provider, and a second set of beacon events, that correspond to different points during playback of the second content, at which tracking beacons configured by the second content provider are sent directly to the second content provider;
producing, at the particular streaming server, a single unified stream with the primary content, the first content included in place of the first break of the primary content, and the second content included in place of the second break of the primary content;
generating, at the particular streaming server, a client-side beaconing configuration comprising (i) the first set of beacon events that are obtained from the first content provider, and that control sending of a first set of tracking beacons to the first content provider, and (ii) the second set of beacon events that are obtained from the second content provider, and that control sending of a second set of tracking beacons to the second content provider;
sending from the particular streaming server to the client device in response to the request, said client-side beaconing configuration contemporaneously with the single unified stream; and
sending the first set of tracking beacons from the client device to the first content provider in response to playback of the first content from the unified stream on the client device satisfying the first set of beacon events.

12. The method of claim 11, wherein the client-side beaconing configuration further comprises (iii) a first set of Uniform Resource Locators (URLs) associated with the first set of beacon events, wherein each URL from the first set of URLs directs a tracking beacon from the first set of tracking beacons to the first content provider, and identifies a triggered event from the first set of beacon events, and (iv) a second set of URLs associated with the second set of beacon events, wherein each URL from the second set of URLs directs a tracking beacon from the second set of tracking beacons to the second content provider, and identifies a triggered event from the second set of beacon events.

13. The method of claim 11, wherein generating the client-side beaconing configuration further comprises inserting a first start time of the first break and a second start time of the second break in said configuration.

14. The method of claim 11 further comprising sending the second set of tracking beacons from the client device to the second content provider in response to playback of the second content from the unified stream on the client device satisfying the second set of beacon events.

15. The method of claim 11 further comprising detecting execution of an advertisement blocker on the client device.

16. The method of claim 15 further comprising identifying the first and second breaks from scanning the primary content and producing the single unified stream in response to said detecting.

17. A method comprising:
sending a request for primary content from a client device to a streaming server, the primary content comprising at least a first break;
receiving at the client device in response to said request,
(i) a first set of beaconing events and a first set of Uniform Resource Locators (URLs) that are defined by a first content provider of first content with each beaconing event of the first set of beaconing events corresponding to different points during playback of the first content at which tracking beacons configured by the first content provider are sent directly to the first content provider via the first set of URLs, and
(ii) a second set of beaconing events and a second set of URLs that are defined by a second content provider of second content with each beaconing event of the second set of beaconing events corresponding to different points during playback of the second content at which tracking beacons configured by the second content provider are sent directly to the second content provider via the second set of URLs, and
wherein the first content and the second content are different than the primary content identified in the request from the client device;
receiving a unified stream at the client device from the streaming server in response to said request for the primary content, the unified stream comprising (i) the primary content and (ii) the first content of the first content provider and the second content of the second provider, inserted in the first break of the primary content;
sending a first tracking beacon from the client device to the first content provider by invoking a first URL from the first set of URLs in response to a first event from the first set of beaconing events triggering during playback of the first content from within the unified stream and the first event being associated with the first URL; and
sending a second tracking beacon from the client device to the second content provider by invoking a second URL from the second set of URLs in response to a second event from the second set of beaconing events triggering during playback of the second content from within the unified stream and the second event being associated with the second URL.

18. The method of claim 17, wherein the unified stream comprises a plurality of segments encoding the primary content, the first content, and the second content, the method further comprising requesting a set of the plurality of segments encoding the first content as a result of said sending the request for the primary content.

* * * * *